(12) United States Patent
Sultenfuss et al.

(10) Patent No.: US 11,632,845 B1
(45) Date of Patent: Apr. 18, 2023

(54) MANAGING A LIGHT SOURCE OF A POWER ADAPTER OF AN INFORMATION HANDLING SYSTEM

(71) Applicant: Dell Products L.P., Round Rock, TX (US)

(72) Inventors: Andrew T. Sultenfuss, Leander, TX (US); Wei-Cheng Yu, New Taipei (TW); Chi-Che Wu, Taipei (TW); Tsung-Cheng Liao, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/447,987

(22) Filed: Sep. 17, 2021

(51) Int. Cl.
*G06F 1/28* (2006.01)
*H05B 47/17* (2020.01)

(52) U.S. Cl.
CPC .............. *H05B 47/17* (2020.01); *G06F 1/28* (2013.01)

(58) Field of Classification Search
CPC .................................. H05B 47/17; G06F 1/28
See application file for complete search history.

(56) References Cited

U.S. PATENT DOCUMENTS

2008/0222431 A1* 9/2008 Paniagua ............ H02J 7/00047
713/300
2011/0296162 A1* 12/2011 Pakenham ............ G06F 1/3203
315/132

\* cited by examiner

*Primary Examiner* — Mark A Connolly
(74) *Attorney, Agent, or Firm* — McDermott Will & Emery LLP

(57) ABSTRACT

In one embodiment, a method for managing a light source of a power adapter includes: determining that the power adapter is coupled to a power supply; causing the light source to be in a first illuminated state indicating that the power adapter is receiving the power from the power supply; determining that a first instance of a threshold period of inactivity has occurred; causing the light source to be in an unilluminated state; determining that the power adapter is communicably coupled to an information handling system; causing the light source to be in a second illuminated state indicating that the power adapter is providing the power to the information handling system; determining that a second instance of the threshold period of inactivity has occurred; and causing the light source to be in the unilluminated state.

17 Claims, 3 Drawing Sheets

MANAGING A LIGHT SOURCE OF A POWER ADAPTER OF AN INFORMATION HANDLING SYSTEM

BACKGROUND

Field of the Disclosure

The disclosure relates generally to information handling systems, and in particular to managing a light source of a power adapter of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing a light source of a power adapter of an information handling system includes: determining, by a source controller of the power adapter, that the power adapter is coupled to a power supply, the power adapter receiving power from the power supply; causing, by the source controller, the light source to be in a first illuminated state indicating that the power adapter is receiving the power from the power supply; determining, by the source controller, that a first instance of a threshold period of inactivity has occurred, the threshold period of inactivity comprising a period of time in which a power event has not occurred; causing, by the source controller, the light source to be in an unilluminated state in response to determining that the first instance of the threshold period of inactivity has occurred; determining, by the source controller, that the power adapter is communicably coupled to the information handling system, the power adapter providing the power to the information handling system; causing, by the source controller, the light source to be in a second illuminated state indicating that the power adapter is providing the power to the information handling system; determining, by the source controller, that a second instance of the threshold period of inactivity has occurred; and causing, by the source controller, the light source to be in the unilluminated state in response to determining that the second instance of the threshold period of inactivity has occurred.

In one or more of the disclosed embodiments, determining that the first instance of the threshold period of inactivity has occurred includes: determining, by the source controller, that the power adapter is not communicably coupled to the information handling system; waiting, by the source controller, for the threshold period of inactivity to elapse; and determining, by the source controller, that the threshold period of inactivity has elapsed.

In one or more of the disclosed embodiments, determining that the power adapter is communicably coupled to the information handling system includes: determining, by the source controller, that the power is being provided to the information handling system via a power bus communicably coupling the power adapter to the information handling system.

In one or more of the disclosed embodiments, the method further includes: receiving, by the source controller, a request for a list indicating a plurality of light source modes from a sink controller of the information handling system, each of the plurality of light source modes causing the light source to operate according to a predefined state; sending, by the source controller, the list indicating the plurality of light source modes; receiving, by the source controller, a selection from the list indicating the plurality of light source modes, the selection indicating a selected light source mode of the plurality of light source modes; and causing, by the source controller, the light source to operate according to the selected light source mode.

In one or more of the disclosed embodiments, the request for the list indicating the plurality of light source modes from the sink controller is received by the source controller in an unstructured vendor defined message (VDM) packet.

In one or more of the disclosed embodiments, determining that the second instance of the threshold period of inactivity has occurred includes: determining, by the source controller, that the power adapter is coupled to the power supply and communicably coupled to the information handling system; waiting, by the source controller, for the threshold period of inactivity to elapse; and determining, by the source controller, that the threshold period of inactivity has elapsed.

In one or more of the disclosed embodiments, causing the light source to be in the unilluminated state includes: causing, by the source controller, the light source to stop receiving the power from the power supply.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
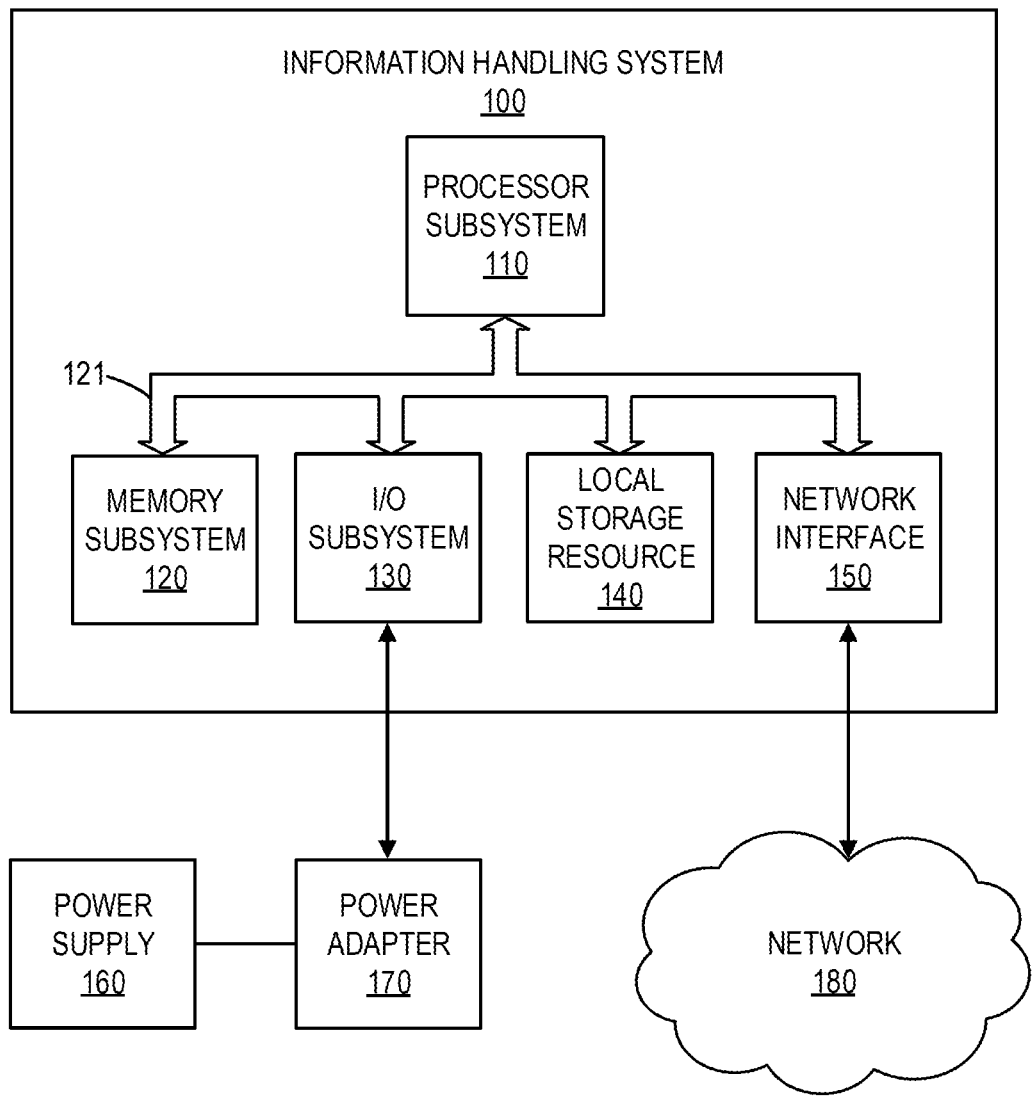
FIG. 1 is a block diagram of selected elements of an embodiment of a computing environment that includes an information handling system and a power adapter.

This document describes a method for managing a light source of a power adapter of an information handling system that includes: determining, by a source controller of the power adapter, that the power adapter is coupled to a power supply, the power adapter receiving power from the power supply; causing, by the source controller, the light source to be in a first illuminated state indicating that the power adapter is receiving the power from the power supply; determining, by the source controller, that a first instance of a threshold period of inactivity has occurred, the threshold period of inactivity comprising a period of time in which a power event has not occurred; causing, by the source controller, the light source to be in an unilluminated state in response to determining that the first instance of the threshold period of inactivity has occurred; determining, by the source controller, that the power adapter is communicably coupled to the information handling system, the power adapter providing the power to the information handling system; causing, by the source controller, the light source to be in a second illuminated state indicating that the power adapter is providing the power to the information handling system; determining, by the source controller, that a second instance of the threshold period of inactivity has occurred; and causing, by the source controller, the light source to be in the unilluminated state in response to determining that the second instance of the threshold period of inactivity has occurred.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
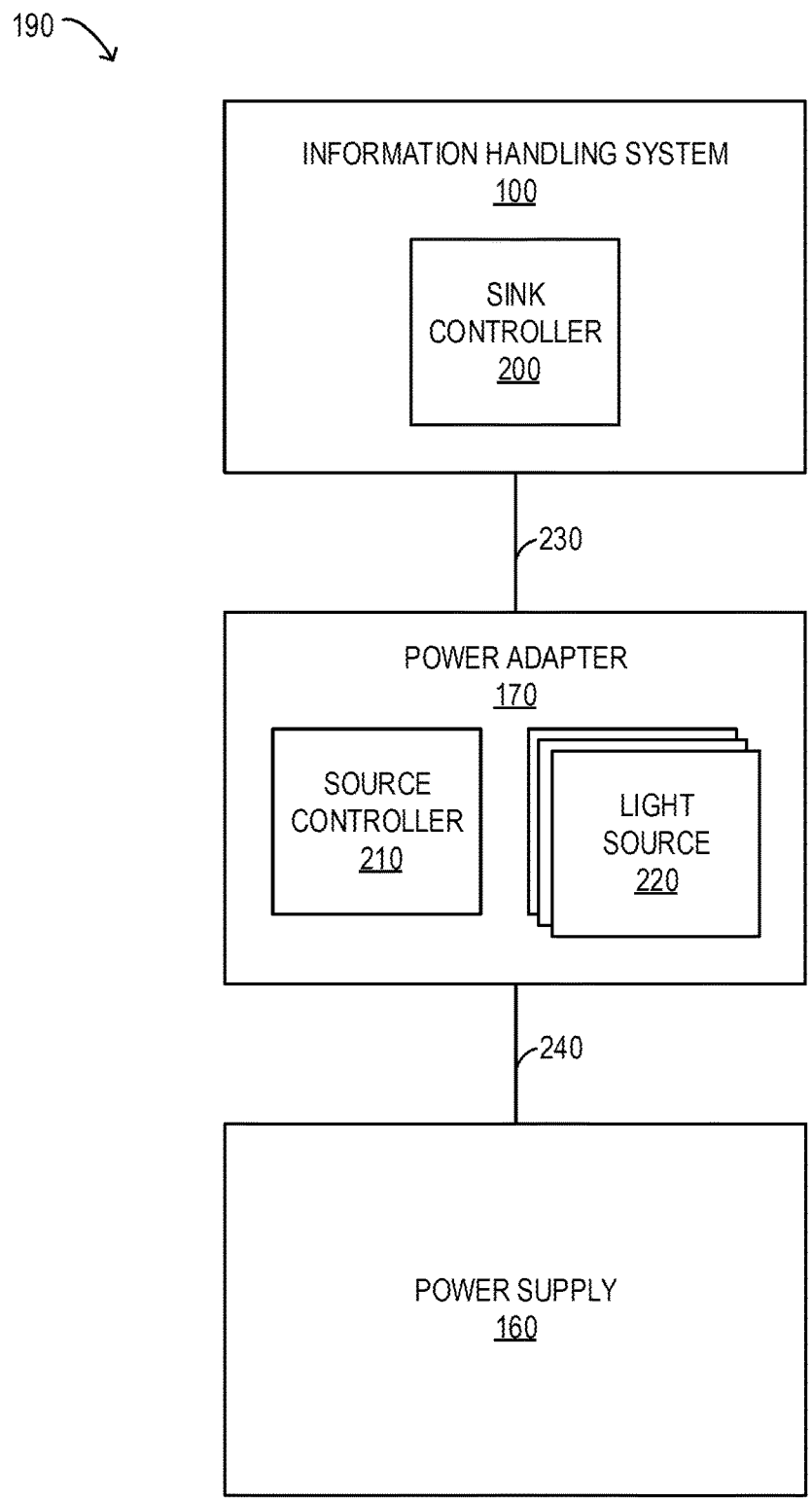
FIG. 2 is a block diagram of selected elements of an embodiment of a power adapter communicably coupled to an information handling system.
Figure 3:
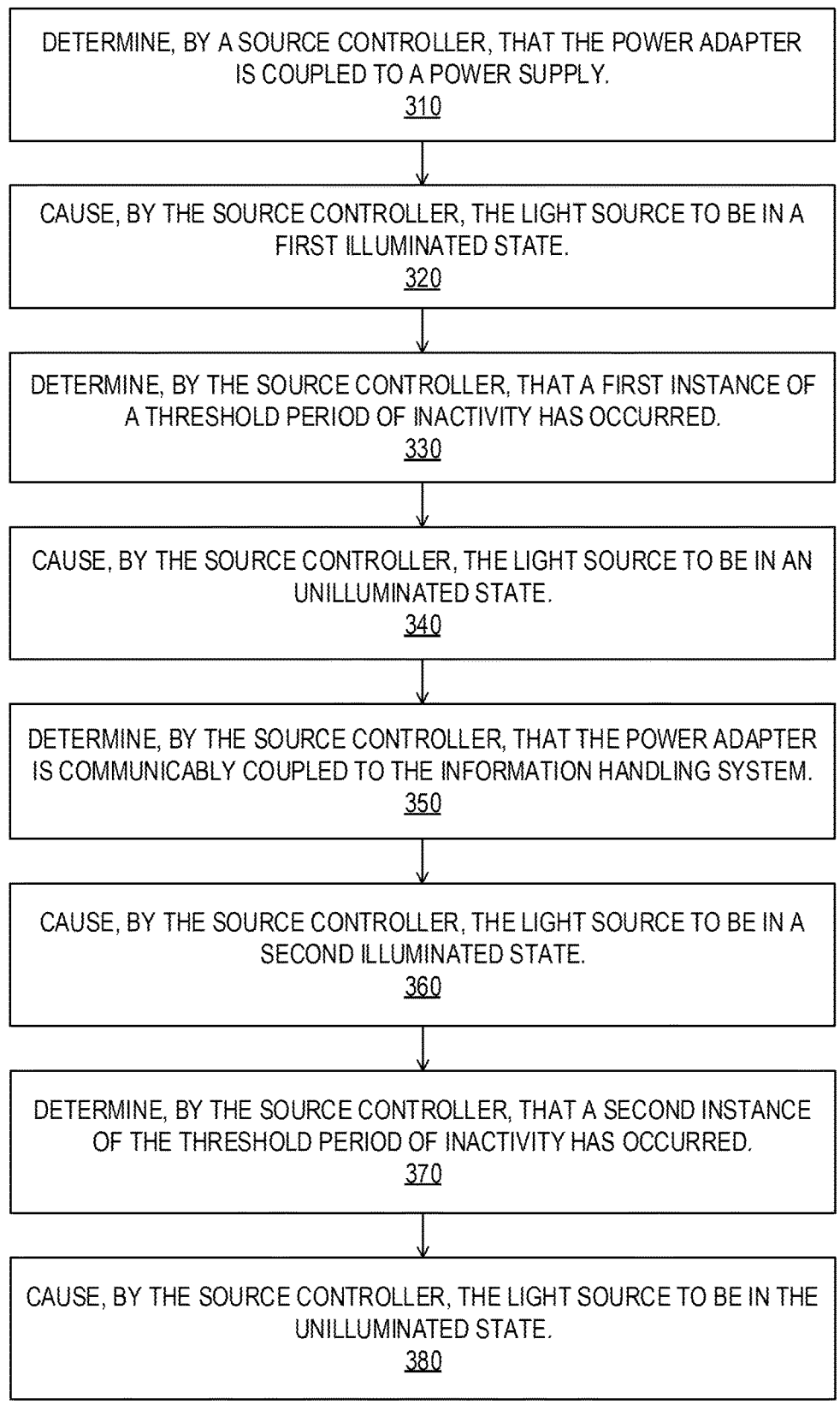
FIG. 3 is a flowchart depicting selected elements of an embodiment of a method for managing a light source of a power adapter of an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 110, which may comprise one or more processors, and system bus 121 that communicatively couples various system components to processor subsystem 110 including, for example, a memory subsystem 120, an I/O subsystem 130, a local storage resource 140, and a network interface 150. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. In other embodiments, computing environment 190 may include additional, fewer, and/or different components than the components shown in FIG. 1.

In information handling system 100, processor subsystem 110 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 110 may interpret and/or execute program instructions and/or process data stored locally (e.g., in memory subsystem 120 and/or another component of information handling system 100). In the same or alternative embodiments, processor subsystem 110 may interpret and/or execute program instructions and/or process data stored remotely. In one embodiment, processor subsystem 110 may be or include a multi-core processor comprised of one or more processing cores disposed upon an integrated circuit (IC) chip. In other embodiments, processor subsystem 110 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 120 may comprise a system, device, or apparatus operable to retain and/or retrieve program instructions and/or data for a period of time (e.g., computer-readable media). Memory subsystem 120 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 130 may comprise a system, device, or apparatus generally operable to receive and/or transmit data to, from, and/or within information handling system 100. I/O subsystem 130 may represent, for example, a variety of communication interfaces, graphics interfaces, video interfaces, user input interfaces, and/or peripheral interfaces. In various embodiments, I/O subsystem 130 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 150 may be a suitable system, apparatus, or device operable to serve as an interface between information handling system 100 and a network 180. Network interface 150 may enable information handling system 100 to communicate over network 180 using a suitable transmission protocol and/or standard, including, but not limited to, transmission protocols and/or standards enumerated below with respect to the discussion of network 180. Network 180 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 150 may enable wired and/or wireless communications (e.g., NFC or Bluetooth) to and/or from information handling system 100.

In particular embodiments, network 180 may include one or more routers for routing data between client information handling systems 100 and server information handling systems 100. A device (e.g., a client information handling system 100 or a server information handling system 100) on network 180 may be addressed by a corresponding network address including, for example, an Internet protocol (IP) address, an Internet name, a Windows Internet name service (WINS) name, a domain name or other system name. In particular embodiments, network 180 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 180 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 180 and its various components may be implemented using hardware, software, or any combination thereof.

In computing environment 190, power supply 160 may be a suitable system, apparatus, or device operable to provide power to one or more components of computing environment 190. Specifically, power supply 160 may be or include an alternating current (AC) power supply (e.g., a wall outlet) operable to provide AC power to power adapter 170. For example, power adapter 170 may be coupled to power supply 160 via a grounded, or ungrounded, power cable (power cable 240 shown in FIG. 2) of power adapter 170 that includes prongs configured to be received by slots disposed on a wall-mounted plate of power supply 160. Power supply 160 is described in further detail with respect to FIG. 2.

In computing environment 190, power adapter 170 may be a suitable system, apparatus, or device operable to provide power to information handling system 100. In particular, power adapter 170 may be or include an AC power adapter operable to convert AC power received from power supply 160 (e.g., a wall outlet) into a DC power to be provided to, and consumed by, information handling system 100. That is, power adapter 170 may convert AC power into a low-voltage, regulated direct current (DC) to be supplied to internal components of information handling system 100. In one embodiment, power adapter 170 may include one or more light sources (e.g., light source 220 shown in FIG. 2) operable to indicate changes in state, or "power events," with respect to power being received, and/or delivered, by power adapter 170. A conventional power adapter may include one or more light-emitting diodes (LEDs) operable to illuminate in response to receiving power from a power supply (e.g., a wall outlet), thereby indicating that the conventional power adapter is receiving power from the power supply. However, the conventional power adapter may cause the one or more LEDs to remain illuminated during the duration in which power is being received from the power supply, causing the conventional power adapter to continue drawing power from the power supply to allow the one or more LEDs to remain illuminated. As such, the conventional power adapter may cause an increase in electricity being consumed by a user's household and/or business, thereby decreasing user overall user experience as power costs increase. Further, simply allowing the one or more LEDs to remain illuminated may cause light pollution within the user's household and/or business while failing to indicate any changes in state with respect to power being received, and/or delivered, by the conventional power adapter.

In contrast, power adapter 170 may cause one or more light sources to be illuminated, or in an "illuminated state," in response to a power event. Similarly, power adapter 170 may cause the one or more light sources to be unilluminated, or in an "unilluminated state," in response to a period of time in which a power event has not occurred, or a "threshold period of inactivity." In doing so, power adapter 170 may cause a decrease in electricity being consumed by a user's household and/or business, thereby increasing overall user experience. In addition, causing the one or more light sources to be in an unilluminated state in response to threshold periods of inactivity may decrease light pollution within the user's household and/or business during instances in which there are no power events to indicate. Power adapter 170 is described in further detail with respect to FIG. 2.

FIG. 2 is a block diagram of selected elements of an embodiment of a power adapter communicably coupled to an information handling system. In the embodiment illustrated in FIG. 2, power adapter 170 includes a source controller 210 and one or more light sources 220. Information handling system 100 includes a sink controller 200. As shown in FIG. 2, information handling system 100 may be communicably coupled to power adapter 170 via adapter connector cable 230. Similarly, power adapter 170 may be coupled to power supply 160 via power cable 240. In other embodiments, computing environment 190 may include additional, fewer, and/or different components than the components shown in FIG. 2.

In one embodiment, light source 220 may be a suitable system, apparatus, or device operable to indicate a power event associated with power adapter 170. In particular, light source 220 may be or include a semiconductor light source (e.g., semiconductor diode) operable to be in an illuminated state in response to a power event associated with power adapter 170. For example, source controller 210 of power adapter 170 may cause light source 220 to be in an illuminated state to indicate that power adapter 170 is coupled to, and receiving power from, power supply 160. Similarly, light source 220 may be in an unilluminated state in response to a threshold period of inactivity in which no power events have occurred. For example, source controller 210 of power adapter 170 may cause light source 220 to be in an unilluminated state to indicate that a threshold period of inactivity has occurred in which power adapter 170 has remained both coupled to power supply 160 and communicably coupled to information handling system 100. In one embodiment, light source 220 may be or include one or more light-emitting diodes (LEDs) disposed on one or more surfaces of power adapter 170. For example, power adapter 170 may include a first LED light source 220 on a power brick component of power adapter 170 and a second LED light source 220 on adapter connector cable 230 of power adapter 170 used to communicably couple the power brick component to the information handling system 100. In other embodiments, light source 220 may be or include an incandescent light, a fluorescent light, a multi-color LED, and/or any other light source suitable for indicating a power event associated with power adapter 170.

In one embodiment, sink controller 200 may be a suitable system, apparatus, or device operable to communicate with source controller 210. In particular, sink controller 200 may be or include an electronic hardware device (e.g., a microcontroller, field-programmable gate array, integrated circuit, and the like) operable to communicate with source controller 210 to manage light source 220. That is, sink controller 200 may be communicably coupled to source controller 210 such that sink controller 200 may communicate with source controller 210 to cause light source 220 to be in an illuminated state. In one embodiment, sink controller may be or include a Universal Serial Bus (USB) Type-C Power Delivery (PD) integrated circuit (IC) operable to communicate with source controller 210 in accordance with a USB-PD protocol. In other embodiments, sink controller 200 may be or include a PD IC associated with USB Mini B, USB Micro B, USB 3.0, and/or any other type of PD IC operable to communicate with source controller 210 of power adapter 170.

In one embodiment, source controller 210 may be a suitable system, apparatus, or device operable to manage light source 220 of power adapter 170. Specifically, source controller 210 may be or include an electronic hardware device (e.g., a microcontroller, field-programmable gate array, integrated circuit, and the like) operable to cause light source 220 to be in an illuminated state in response to a power event associated with power adapter 170 and to be in an unilluminated state in response to a threshold period of inactivity. That is, source controller 210 may cause light source 220 to be in an illuminated state in response to a power event (e.g., power adapter 170 receiving power from power supply 160, power adapter 170 providing power to information handling system 100, and the like) to indicate to a user of power adapter 170, and/or information handling system 100, that the power event occurred. Source controller 210 may cause light source 220 to be in an unilluminated state in response to a threshold period of inactivity (e.g., 10 seconds, 15 seconds, 20 seconds, and the like) to indicate to the user of power adapter 170, and/or information handling system 100, that no recent power events have occurred. In addition, causing light source 220 to be in an unilluminated state in response to the threshold period of inactivity may cause a decrease in electricity being consumed by the user's household and/or business while decreasing light pollution therein. In one embodiment, source controller 210 may be or include a USB Type-C PD IC operable to manage light source 220 in accordance with a USB-PD protocol. In other embodiments, source controller 210 may be or include a PD IC associated with USB Mini B, USB Micro B, USB 3.0, and/or any other type of PD IC operable to manage light source 220 of power adapter 170.

In one embodiment, source controller 210 may determine that power adapter 170 is coupled to power supply 160. In particular, source controller 210 may determine that power adapter 170 is receiving power from power supply 160 via power cable 240. As shown in FIG. 2, power adapter 170 may be coupled to power supply 160 via power cable 240 of power adapter 170. In one embodiment, source controller 210 may cause light source 220 to be in a first illuminated state in response to determining that power adapter 170 is receiving power from power supply 160 via power cable 240. For example, a user may plug power cable 240 of power adapter 170 into power supply 160 and, in response, source controller 210 may cause at least one light source 220 to be in an illuminated state indicating to the user that power adapter 170 is receiving power from power supply 160. In this example, the at least one light source 220 may be disposed on a power brick component of power adapter 170 and/or on adapter connector cable 230 of power adapter 170. As shown in FIG. 2, adapter connector cable 230 may be used to communicably couple power adapter 170 to information handling system 100.

In one embodiment, source controller 210 may determine that a threshold period of inactivity has occurred. Specifically, source controller 210 may determine that a first instance of a threshold period of inactivity has occurred after causing light source 220 to be in the first illuminated state described above. In one embodiment, to determine that the first instance of the threshold period of inactivity has occurred, source controller 210 may determine that power adapter 170 is not communicably coupled to information handling system 100. For example, source controller 210 may determine that power adapter 170 is not providing power to information handling system 100 via adapter connector cable 230 of power adapter 170, thereby indicating that power adapter 170 is not communicably coupled to information handling system 100. Once determined, source controller 210 may wait for the threshold period of inactivity to elapse (e.g., waiting 5 seconds, 10 seconds, 15 seconds, and the like). For example, source controller 210 may cause light source 220 to be in the first illuminated state described above and may wait for a threshold period of inactivity spanning 15 seconds to elapse in which no further power events occur. Source controller 210 may then determine that the threshold period of inactivity has elapsed.

Upon determining that this first instance of the threshold period of inactivity has occurred, source controller 210 may cause light source 220 to be in an unilluminated state. In particular, source controller 210 may cause light source 220 to stop receiving power from power supply 160. For example, source controller 210 may cause a switch coupling light source 220 to power supply 160 to be in an open position, separating light source 220 from power supply 160. In one embodiment, light source 220 may gradually transition, or otherwise diminish in brightness, from the first illuminated state to the unilluminated state. In another embodiment, light source 220 may rapidly transition, or otherwise switch, from the first illuminated state to the unilluminated state. In other embodiments, light source 220 may exhibit one or more light patterns while transitioning from the first illuminated state to the unilluminated state. For example, light source 220 may exhibit a pulsing pattern, a breathing pattern, a blinking pattern, and/or any other light pattern suitable for transitioning from an illuminated state to an unilluminated state. By causing light source 220 to be in the unilluminated state in response to threshold periods of inactivity, source controller 210 may decrease the amount of electricity being consumed by a user's household and/or business, thereby increasing overall user experience. Further, source controller 210 may decrease light pollution within the user's household and/or business during instances in which there are no power events to indicate.

In one embodiment, source controller 210 may determine that power adapter 170 is communicably coupled to information handling system 100. Specifically, source controller 210 may determine that power adapter 170 is providing power to information handling system 100 via adapter connector cable 230. As shown in FIG. 2, power adapter 170 may be communicably coupled to information handling system 100 via adapter connector cable 230 of power adapter 170. In one embodiment, to determine that power adapter 170 is communicably coupled to information handling system 100, source controller 210 may determine that power is being provided to information handling system 100 via a power bus within adapter connector cable 230 communicably coupling power adapter 170 to information handling system 100. For example, source controller 210 may determine that power adapter 170 is providing power to information handling system 100 via a VBUS within adapter connector cable 230 according to a USB-PD protocol. In another embodiment, source controller 210 may determine that power adapter 170 is communicably coupled to information handling system 100 by negotiating a power delivery protocol (e.g., USB-PD, USB-PD Rev. 2.0, and the like) with sink controller 200 of information handling system 100.

In one embodiment, source controller 210 may cause light source 220 to be in a second illuminated state in response to determining that power adapter 170 is communicably coupled to information handling system 100 via adapter connector cable 230. For example, a user may plug adapter connector cable 230 of power adapter 170 into information handling system 100 and, in response, source controller 210 may cause at least one light source 220 to be in illuminated state indicating to the user that power adapter 170 is providing power to information handling system 100. In this example, the at least one light source 220 may be disposed on the power brick component of power adapter 170 and/or on adapter connector cable 230 of power adapter 170.

In one embodiment, the illuminated state of light source 220 may be caused by source controller 210 according to a negotiation between source controller 210 and sink controller 200. Specifically, source controller 210 may receive a request for an inventory of available light patterns, or "light source modes," from sink controller 200 when power adapter 170 is communicably coupled to information handling system 100. Here, source controller 210 may receive a request for a list indicating light source modes from sink controller 200, where each of the light source modes cause light source 220 to operate according to a predefined state. Examples of light source modes may include pulsing patterns, breathing patterns, blinking patterns, and/or any other predefined states suitable for causing light source 220 to illuminate. In response, source controller 210 may send the list indicating the light source modes to sink controller 200 via adapter connector cable 230. Sink controller 200 may receive the list indicating the light source modes and may select a light source mode from the list (e.g., based on firmware/software instructions stored in sink controller 200 and/or information handling system 100). Source controller 210 may receive the selection from sink controller 200 via adapter connector cable 230, where the selection indicates the selected light source mode from the list indicating light source modes. Upon receiving the selection, source controller 210 may cause light source 220 to operate according to the selected light source mode. In one embodiment, the negotiation between source controller 210 and sink controller 200 described above may comprise a handshake between power adapter 170 and information handling system 100. For example, the negotiation may occur via one or more unstructured vendor defined message (VDM) packets. In another embodiment, source controller 210 may simply cause light source 220 to be in a solid illuminated state upon identifying that information handling system 100 includes a legacy architecture (e.g., hardware devices, software, and/or firmware). In yet another embodiment, source controller 210 may cause light source 220 to provide, or otherwise convey, diagnostic information to a user of information handling system 100 in response to a failure event associated with power adapter 170. For example, in response to undergoing one or more failure events, source controller 210 may cause light source 220 to illuminate in a blinking pattern and/or present one or more colors to indicate to the user that source controller 210 is undergoing one or more failure events. In this embodiment, the light pattern for fault includes an internal base. Source controller 210 may prevent further communication with sink controller 200 until the one or more failures have been resolved (e.g., by a user removing power adapter 170 and/or information handling system 100 from power supply 160).

In one embodiment, source controller 210 may determine that an additional threshold period of inactivity has occurred. In particular, source controller 210 may determine that a second instance of a threshold period of inactivity has occurred after causing light source 220 to be in the second illuminated state described above. In one embodiment, to determine that the second instance of the threshold period of inactivity has occurred, source controller 210 may determine that power adapter 170 is coupled to power supply 160 and communicably coupled to information handling system 100. For example, source controller 210 may determine that power adapter 170 is receiving power from power supply 160 via power cable 240 and that power adapter 170 is providing power to information handling system 100 via adapter connector cable 230, thereby indicating that power adapter 170 is coupled to power supply 160 and communicably coupled to information handling system 100, respectively. Once determined, source controller 210 may wait for the threshold period of inactivity to elapse (e.g., waiting 5 seconds, 10 seconds, 15 seconds, and the like). For example, source controller 210 may cause light source 220 to be in the second illuminated state described above and may wait for a threshold period of inactivity spanning 15 seconds to elapse in which no further power events occur. Source controller 210 may then determine that the threshold period of inactivity has elapsed.

Upon determining that this second instance of the threshold period of inactivity has occurred, source controller 210 may cause light source 220 to be in an unilluminated state. Specifically, source controller 210 may cause light source 220 to stop receiving power from power supply 160. For example, source controller 210 may cause a switch coupling light source 220 to power supply 160 to be in an open position, separating light source 220 from power supply 160. In one embodiment, light source 220 may gradually transition, or otherwise diminish in brightness, from the second illuminated state to the unilluminated state. In another embodiment, light source 220 may rapidly transition, or otherwise switch, from the second illuminated state to the unilluminated state. In other embodiments, light source 220 may exhibit one or more light patterns while transitioning from the second illuminated state to the unilluminated state. For example, light source 220 may exhibit a pulsing pattern, a breathing pattern, a blinking pattern, and/or any other light pattern suitable for transitioning from an illuminated state to an unilluminated state. By causing light source 220 to be in the unilluminated state in response to threshold periods of inactivity, source controller 210 may decrease the amount of electricity being consumed by a user's household and/or business, thereby increasing overall user experience. Further, source controller 210 may decrease light pollution within the user's household and/or business during instances in which there are no power events to indicate.

FIG. 3 is a flowchart depicting selected elements of an embodiment of a method for managing a light source of a power adapter of an information handling system. It is noted that certain operations described in method 300 may be optional or may be rearranged in different embodiments.

Method 300 may begin at step 310, where a source controller of the power adapter may determine that the power adapter is coupled to a power supply. The power adapter may receive power from the power supply. For example, source controller 210 may determine that power adapter 170 is receiving power from power supply 160 via power cable 240 as described above with respect to FIG. 2. In step 320, the source controller may cause the light source to be in a first illuminated state indicating that the power adapter is receiving power from the power supply. For example, source controller 210 may cause light source 220 to be in a first illuminated state in response to determining that power adapter 170 is receiving power from power supply 160 via power cable 240 as described above with respect to FIG. 2. In step 330, the source controller may determine that a first instance of a threshold period of inactivity has occurred. The threshold period of inactivity may be or include a period of time in which a power event has not occurred. For example, source controller 210 may determine that a first instance of a threshold period of inactivity has occurred after causing light source 220 to be in the first illuminated state as described above with respect to FIG. 2. In particular, source controller 210 may determine that power adapter 170 is not communicably coupled to information handling system 100, wait for the threshold period of inactivity to elapse (e.g., waiting 5 seconds, 10 seconds, 15 seconds, and the like), and may then determine that the threshold period of inactivity has elapsed. In step 340, the source controller may cause the light source to be in an unilluminated state in response to determining that the first instance of the threshold period of inactivity has occurred. For example, source controller 210 may cause light source 220 to stop receiving power from power supply 160 as described above with respect to FIG. 2. In step 350, the source controller may determine that the power adapter is communicably coupled to the information handling system. The power adapter may provide power to the information handling system. For example, source controller 210 may determine that power adapter 170 is providing power to information handling system 100 via a VBUS within adapter connector cable 230 according to a USB-PD protocol as described above with respect to FIG. 2. In step 360, the source controller may cause the light source to be in a second illuminated state indicating that the power adapter is providing power to the information handling system. For example, source controller 210 may cause light source 220 to be in a second illuminated state in response to determining that power adapter 170 is communicably coupled to information handling system 100 via adapter connector cable 230 as described above with respect to FIG. 2. In step 370, the source controller may determine that a second instance of the threshold period of inactivity has occurred. For example, source controller 210 may determine that a second instance of a threshold period of inactivity has occurred after causing light source 220 to be in the second illuminated state as described above with respect to FIG. 2. Specifically, source controller 210 may determine that power adapter 170 is coupled to power supply 160 and communicably coupled to information handling system 100, wait for the threshold period of inactivity to elapse (e.g., waiting 5 seconds, 10 seconds, 15 seconds, and the like), and may then determine that the threshold period of inactivity has elapsed. In step 380, the source controller may cause the light source to be in the unilluminated state in response to determining that the second instance of the threshold period of inactivity has occurred. For example, source controller 210 may cause light source 220 to stop receiving power from power supply 160 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a light source of a power adapter of an information handling system, the method comprising:
   determining, by a source controller of the power adapter, that the power adapter is coupled to a power supply, the power adapter receiving power from the power supply;
   causing, by the source controller, the light source to be in a first illuminated state indicating that the power adapter is receiving the power from the power supply;
   determining, by the source controller, that a first instance of a threshold period of inactivity has occurred, the threshold period of inactivity comprising a period of time in which a power event has not occurred;
   causing, by the source controller, the light source to be in an unilluminated state in response to determining that the first instance of the threshold period of inactivity has occurred;
   determining, by the source controller, that the power adapter is communicably coupled to the information handling system, the power adapter providing the power to the information handling system;
   causing, by the source controller, the light source to be in a second illuminated state indicating that the power adapter is providing the power to the information handling system;
   determining, by the source controller, that a second instance of the threshold period of inactivity has occurred;
   causing, by the source controller, the light source to be in the unilluminated state in response to determining that the second instance of the threshold period of inactivity has occurred;
   receiving, by the source controller, a request for a list indicating a plurality of light source modes from a sink controller of the information handling system, each of the plurality of light source modes causing the light source to operate according to a predefined state;
   sending, by the source controller, the list indicating the plurality of light source modes;
   receiving, by the source controller, a selection from the list indicating the plurality of light source modes, the selection indicating a selected light source mode of the plurality of light source modes; and
   causing, by the source controller, the light source to operate according to the selected light source mode.

2. The method of claim 1, wherein determining that the first instance of the threshold period of inactivity has occurred comprises:
   determining, by the source controller, that the power adapter is not communicably coupled to the information handling system;
   waiting, by the source controller, for the threshold period of inactivity to elapse; and
   determining, by the source controller, that the threshold period of inactivity has elapsed.

3. The method of claim 1, wherein determining that the power adapter is communicably coupled to the information handling system comprises:
   determining, by the source controller, that the power is being provided to the information handling system via a power bus communicably coupling the power adapter to the information handling system.

4. The method of claim 1, wherein the request for the list indicating the plurality of light source modes from the sink controller is received by the source controller in an unstructured vendor defined message (VDM) packet.

5. The method of claim 1, wherein determining that the second instance of the threshold period of inactivity has occurred comprises:
   determining, by the source controller, that the power adapter is coupled to the power supply and communicably coupled to the information handling system;
   waiting, by the source controller, for the threshold period of inactivity to elapse; and
   determining, by the source controller, that the threshold period of inactivity has elapsed.

6. The method of claim 1, wherein causing the light source to be in the unilluminated state comprises:
   causing, by the source controller, the light source to stop receiving the power from the power supply.

7. A power adapter of an information handling system, comprising:
   a light source; and
   a source controller configured to:
   determine that the power adapter is coupled to a power supply, the power adapter receiving power from the power supply;
   cause the light source to be in a first illuminated state indicating that the power adapter is receiving the power from the power supply;
   determine that a first instance of a threshold period of inactivity has occurred, the threshold period of inactivity comprising a period of time in which a power event has not occurred;

cause the light source to be in an unilluminated state in response to determining that the first instance of the threshold period of inactivity has occurred;

determine that the power adapter is communicably coupled to the information handling system, the power adapter providing the power to the information handling system;

cause the light source to be in a second illuminated state indicating that the power adapter is providing the power to the information handling system;

determine that a second instance of the threshold period of inactivity has occurred; and cause the light source to be in the unilluminated state in response to determining that the second instance of the threshold period of inactivity has occurred;

receive a request for a list indicating a plurality of light source modes from a sink controller of the information handling system, each of the plurality of light source modes causing the light source to operate according to a predefined state;

send the list indicating the plurality of light source modes;

receive a selection from the list indicating the plurality of light source modes, the selection indicating a selected light source mode of the plurality of light source modes; and cause the light source to operate according to the selected light source mode.

8. The power adapter of claim 7, wherein to determine that the first instance of the threshold period of inactivity has occurred, the power adapter is further configured to:

determine that the power adapter is not communicably coupled to the information handling system;

wait for the threshold period of inactivity to elapse; and determine that the threshold period of inactivity has elapsed.

9. The power adapter of claim 7, wherein to determine that the power adapter is communicably coupled to the information handling system, the power adapter is further configured to:

determine that the power is being provided to the information handling system via a power bus communicably coupling the power adapter to the information handling system.

10. The power adapter of claim 7, wherein the request for the list indicating the plurality of light source modes from the sink controller is received by the source controller in an unstructured vendor defined message (VDM) packet.

11. The power adapter of claim 7, wherein to determine that the second instance of the threshold period of inactivity has occurred, the power adapter is further configured to:

determine that the power adapter is coupled to the power supply and communicably coupled to the information handling system;

wait for the threshold period of inactivity to elapse; and determine that the threshold period of inactivity has elapsed.

12. The power adapter of claim 7, wherein to cause the light source to be in the unilluminated state, the power adapter is further configured to:

cause the light source to stop receiving the power from the power supply.

13. A computing environment, comprising:

an information handling system;

a power supply;

a power adapter including one or more processors; and one or more computer-readable non-transitory storage media coupled to one or more of the processors and comprising instructions operable when executed by one or more of the processors to cause the system to:

determine, by a source controller of the power adapter, that the power adapter is coupled to the power supply, the power adapter receiving power from the power supply;

cause, by the source controller, a light source of the power adapter to be in a first illuminated state indicating that the power adapter is receiving the power from the power supply;

determine, by the source controller, that a first instance of a threshold period of inactivity has occurred, the threshold period of inactivity comprising a period of time in which a power event has not occurred;

cause, by the source controller, the light source to be in an unilluminated state in response to determining that the first instance of the threshold period of inactivity has occurred;

determine, by the source controller, that the power adapter is communicably coupled to the information handling system, the power adapter providing the power to the information handling system;

cause, by the source controller, the light source to be in a second illuminated state indicating that the power adapter is providing the power to the information handling system;

determine, by the source controller, that a second instance of the threshold period of inactivity has occurred; and cause, by the source controller, the light source to be in the unilluminated state in response to determining that the second instance of the threshold period of inactivity has occurred;

receive, by the source controller, a request for a list indicating a plurality of light source modes from a sink controller of the information handling system, each of the plurality of light source modes causing the light source to operate according to a predefined state;

send, by the source controller, the list indicating the plurality of light source modes;

receive, by the source controller, a selection from the list indicating the plurality of light source modes, the selection indicating a selected light source mode of the plurality of light source modes; and cause, by the source controller, the light source to operate according to the selected light source mode.

14. The computing environment of claim 13, wherein to determine that the first instance of the threshold period of inactivity has occurred, the processors are further operable when executed to:

determine, by the source controller, that the power adapter is not communicably coupled to the information handling system;

wait, by the source controller, for the threshold period of inactivity to elapse; and determine, by the source controller, that the threshold period of inactivity has elapsed.

15. The computing environment of claim 13, wherein to determine that the power adapter is communicably coupled to the information handling system, the processors are further operable when executed to:

determine, by the source controller, that the power is being provided to the information handling system via a power bus communicably coupling the power adapter to the information handling system.

16. The computing environment of claim 13, wherein the request for the list indicating the plurality of light source modes from the sink controller is received by the source controller in an unstructured vendor defined message (VDM) packet.

17. The computing environment of claim 13, wherein to determine that the second instance of the threshold period of inactivity has occurred, the processors are further operable when executed to:
  determine, by the source controller, that the power adapter is coupled to the power supply and communicably coupled to the information handling system;
  wait, by the source controller, for the threshold period of inactivity to elapse; and
  determining, by the source controller, that the threshold period of inactivity has elapsed.

\* \* \* \* \*